US009820064B1

(12) United States Patent
Schumaier et al.

(10) Patent No.: US 9,820,064 B1
(45) Date of Patent: Nov. 14, 2017

(54) METHOD FOR MANUFACTURING CUSTOM IN-EAR MONITOR WITH DECORATIVE FACEPLATE (71) Applicant: Daniel R. Schumaier, Elizabethton, TN (US)

(72) Inventors: Daniel R. Schumaier, Elizabethton, TN (US); Joseph S. Riner, Johnson City, TN (US)

(73) Assignee: Daniel R. Schumaier, Elizabethton, TN (US)

( * ) Notice: Subject to any disclaimer, the term of this patent is extended or adjusted under 35 U.S.C. 154(b) by 0 days.

(21) Appl. No.: 15/251,596

(22) Filed: Aug. 30, 2016

Related U.S. Application Data (60) Provisional application No. 62/356,083, filed on Jun. 29, 2016.

(51) Int. Cl.
H04R 31/00 (2006.01)
H04R 25/00 (2006.01)
(Continued)

(52) U.S. Cl.
CPC ....... H04R 25/658 (2013.01); B29C 33/3857 (2013.01); B29C 39/02 (2013.01);
(Continued)

(58) Field of Classification Search
CPC . B29C 33/3857; B29C 39/02; B29C 67/0088; B29C 2033/3871;
(Continued)

(56) References Cited

U.S. PATENT DOCUMENTS 1,893,143 A 1/1933 Koch
1,893,474 A 1/1933 Lieber
(Continued)

FOREIGN PATENT DOCUMENTS

EP 0590698 A2 4/1994
EP 0478892 B1 10/1994
EP 1629805 A1 3/2006

OTHER PUBLICATIONS

Alpine Hearing Protection, Alpine MusicSafe Pro, http://www.alpinehearingprotection.com/earplugs/musicsafe-pro/, Accessed Apr. 26, 2016.
(Continued)

Primary Examiner — Donghai D Nguyen
(74) Attorney, Agent, or Firm — Luedeka Neely Group, PC (57) ABSTRACT Methods are disclosed for forming a decorative faceplate for attachment to an ear insert. An impression medium is first inserted into an ear for forming an impression of at least a portion of the ear concha and ear canal. An initial ear insert is formed based on the impression, which insert has an inner portion configured for insertion into the ear canal and an outer portion configured to be disposed in the ear concha and to face outward away from the ear. The outer portion further includes a faceplate attachment area having a perimeter edge that is configured to receive a faceplate. A model of the perimeter edge is generated, and a faceplate is formed from a faceplate material using the model as a guide. A final ear insert is formed, and the faceplate is attached to the faceplate attachment area of the final ear insert.

13 Claims, 6 Drawing Sheets (51) Int. Cl.
    *B29C 33/38*     (2006.01)
    *B29C 39/02*     (2006.01)
    *B29C 67/00*     (2017.01)
    *G06F 17/50*     (2006.01)
    *B29L 31/34*     (2006.01)

(52) U.S. Cl.
    CPC .......... *B29C 67/0088* (2013.01); *G06F 17/50* (2013.01); *B29C 2033/3871* (2013.01); *B29L 2031/34* (2013.01); *G06F 2217/12* (2013.01); *H04R 2225/77* (2013.01); *Y10T 29/49005* (2015.01)

(58) Field of Classification Search
    CPC . B29C 2031/34; G06F 17/50; G06F 2217/12; H04R 25/658; H04R 2225/77; Y10T 29/49005; Y10T 29/46572
    USPC ............ 29/594, 830, 832, 896.21; 200/52 R; 381/322, 328; 700/163
    See application file for complete search history.

(56) References Cited

U.S. PATENT DOCUMENTS

| | | | |
|---|---|---|---|
| 2,477,046 A | | 7/1949 | Davenport |
| 3,041,856 A | | 7/1962 | Neal |
| 4,803,853 A | | 2/1989 | Hoerkens |
| 5,365,593 A | * | 11/1994 | Greenwood ............. A44C 7/00 381/328 |
| 6,148,821 A | | 11/2000 | Falco |
| 6,920,414 B2 | * | 7/2005 | Topholm ................ G06F 17/50 29/896.21 |
| 6,938,622 B2 | | 9/2005 | Huang |
| 7,221,769 B1 | | 5/2007 | Jorgensen |
| 8,111,861 B2 | | 2/2012 | Lowry |
| 8,161,975 B2 | | 4/2012 | Turdjian |
| D707,201 S | | 6/2014 | Arjomand |
| 8,931,489 B2 | | 1/2015 | Smith |
| D725,082 S | | 3/2015 | Palmborg et al. |
| 9,278,031 B2 | | 3/2016 | Brown |
| 9,294,831 B2 | | 3/2016 | Tan et al. |
| 2003/0174853 A1 | | 9/2003 | Howes et al. |
| 2007/0125590 A1 | | 6/2007 | Oberdanner |
| 2008/0025539 A1 | | 1/2008 | Bailey et al. |
| 2011/0289764 A1 | * | 12/2011 | Parsi ...................... H04R 25/60 29/594 |
| 2014/0254852 A1 | | 9/2014 | Haapapuro et al. |
| 2014/0270257 A1 | | 9/2014 | Bauman et al. |
| 2016/0022498 A1 | | 1/2016 | Dittrich et al. |

OTHER PUBLICATIONS

Review: ProSounds X-Pro ear plugs turn on and off with a click; http://www.gizmag.com/review-prosounds-s-pro-ear-plugs/38617/; Accessed Apr. 25, 2016.

* cited by examiner

METHOD FOR MANUFACTURING CUSTOM IN-EAR MONITOR WITH DECORATIVE FACEPLATE

This nonprovisional patent application claims priority to provisional patent application Ser. No. 62/356,083 filed Jun. 29, 2016, titled METHOD FOR MANUFACTURING CUSTOM IN-EAR MONITOR WITH DECORATIVE FACEPLATE, the content of which is incorporated by reference herein in its entirety.

FIELD

The present disclosure relates to in-ear monitors. More particularly, the present invention relates to an in-ear monitor having a faceplate bearing an ornamental design that may be easily replaced with a different ornamental design.

BACKGROUND

In the past, certain hearing devices, such as in-ear monitors or other hearing aids, have had some level of decoration applied to them. However, a problem with these prior hearing devices is that the appearance and decoration was fairly static and unchangeable. In certain situations, users might wish to modify the appearance of their hearing devices. For example, a musician or other performer might wish to coordinate the decoration on an in-ear monitor to match costumes or the on-stage set. Additionally, in other cases, the wearer might wish to change the decoration based on their mood or apparel. They might also wish to express interest in a company, organization, or cause, for example, by decorating the device with logos, slogans, insignia, or other designs. With previous devices, making such a change would be difficult for the wearer to accomplish without damaging the device and would be costly for a technician to carry out because the modification would likely require the removal and exchange of various internal components of the hearing device just to change the decoration applied to the device.

Accordingly, what is needed is an improved method for attaching a decorative faceplate to an ear insert that allows for a more efficient and simpler process than current processes used in the industry.

SUMMARY

An improved method for attaching a decorative faceplate to an ear insert allows for a more efficient and more user-friendly process than current standard procedures in the industry.

In accordance with an embodiment of the present invention, an impression medium is inserted into an ear having an ear concha and ear canal. An impression of at least a portion of the ear concha and ear canal is formed in the impression medium, and an initial ear insert is formed based on the impression. The initial ear insert has an inner portion configured for insertion into the ear canal and an outer portion configured to be disposed in the ear concha and to face outward away from the ear. The outer portion includes a faceplate attachment area having a perimeter edge that is configured to receive a faceplate. Based on the impression, a model of the perimeter edge of the faceplate attachment area of the initial ear insert is generated. Using the model of the perimeter edge of the faceplate attachment area as a guide, a first faceplate is formed from a faceplate material. A final ear insert is formed that includes an inner portion configured for insertion into the ear canal and an outer portion configured be disposed in the ear concha and to face outward away from the ear. The outer portion further includes a faceplate attachment area having a perimeter edge and is configured to receive the first faceplate. The first faceplate is then attached to the faceplate attachment area of the final ear insert.

In certain cases, the method may also include the step of forming a first ornamental design on a surface of the first faceplate. The first ornamental design is visible after the first faceplate has been attached to the final ear insert.

In certain cases, the first faceplate includes an inward-facing surface that is attached to the faceplate attachment area of the final ear insert and an outward-facing surface disposed opposite the inward-facing surface, and the first ornamental design is disposed on the inward-facing surface. Preferably, in those cases, the faceplate material is at least partially transparent so that the first ornamental design is at least partially visible when looking at the outward-facing surface of the first faceplate. In other cases, the first faceplate includes an inward-facing surface that is attached to the faceplate attachment area of the final ear insert and an outward-facing surface disposed opposite the inward-facing surface, and the first ornamental design is disposed on the outward-facing surface.

The method may further include forming a second faceplate from a faceplate material using the model of the perimeter edge of the faceplate attachment area as a guide, forming a second ornamental design on a surface of the second faceplate material, and attaching the second faceplate to the faceplate attachment area of the final ear insert so that the second ornamental design is visible. In certain cases, the second faceplate covers the first faceplate so that the first ornamental design is at least partially covered by second ornamental design. In other cases, the first faceplate is removed from the faceplate attachment area prior to attaching the second faceplate to the faceplate attachment area.

In certain embodiments, the final ear insert comprises a shell having an internal cavity and an opening located in the outer portion. The method further includes inserting sound reproduction electronics into the internal cavity via the opening prior to attaching the faceplate to the final ear insert, wherein the sound reproduction electronics are for generating sound waves in the ear.

In certain embodiments, the model of the perimeter edge of the faceplate attachment area is an electronic model. The electronic model is generated by tracing the perimeter edge of the outer portion of the initial ear insert to generate a traced image, digitizing the traced image to generate a digitized image, and generating the electronic model based on the digitized image. In certain cases, the model generated by this process is a vector model. In certain cases, the model generated by this process is sized on a 1:1 scale with the perimeter edge of the outer portion of the final ear insert.

In certain embodiments, the first faceplate is formed by cutting the faceplate material using a laser. The relative position of the faceplate material with respect to the laser is determined based on the model of the perimeter edge of the faceplate attachment area.

In certain embodiments, a three-dimensional model of the impression is generated by electronically scanning the impression using a three-dimensional scanner.

In accordance with another embodiment of the present disclosure, a method is disclosed for making a pair of custom ear inserts with interchangeable decorative faceplates for an individual having a left ear and a right ear, each having an ear canal and ear concha. According to the method, an impression medium is inserted into each of the left and right ears of the individual. A left ear impression of at least a portion of the left ear concha and canal is formed in the impression medium, and a right ear impression of at least a portion of the right ear concha and canal is formed in the impression medium. An initial left ear insert is formed for insertion into the left ear based on the left ear impression, and an initial right ear insert is formed for insertion into the right ear based on the right ear impression. Each initial ear insert has an inner portion configured for insertion into the ear canal and outer portion configured to be disposed in the ear concha and to face outward away from the ear. The outer portion includes a faceplate attachment area having a perimeter edge and configured to receive a faceplate. The method includes the step of generating a left tracing corresponding to the perimeter edge of the faceplate attachment area of the initial left ear insert and a right tracing corresponding to the perimeter edge of the faceplate attachment area of the initial right ear insert. The left tracing is digitized to form a left model and the right tracing is digitized to form a right model. An aspect ratio of the left and right models is preferably equivalent to an aspect ratio of the left and right tracings. A first left faceplate comprising a faceplate material is formed using the left model as a guide, and a first right faceplate comprising a faceplate material is formed using the right model as a guide. Final left and right ear inserts are then formed. Each final ear insert has an inner portion configured for insertion into the ear canal and an outer portion configured to be disposed in the ear concha and to face outwards away from the ear. The outer portion further includes a faceplate attachment area having a perimeter edge that is configured to receive a faceplate. The first left faceplate is attached to the faceplate attachment area of the final left ear insert and the first right faceplate is attached to the faceplate attachment area of the final right ear insert.

In accordance with another embodiment of the present disclosure, a method for making a custom ear insert having a faceplate is disclosed. According to the method, an impression medium is inserted into an ear having an ear canal and ear concha and an impression of at least a portion of the ear concha and ear canal is formed in the impression medium. An ear insert is formed based on the impression. The ear insert has an inner portion configured for insertion into the ear canal and an outer portion configured to be disposed in the ear concha and to face outward away from the ear. The outer portion includes a faceplate attachment area having a perimeter edge that is configured to receive a faceplate. A model of the perimeter edge of the faceplate attachment area of the ear insert is generated. A first faceplate comprising a faceplate material is formed using the model of the perimeter edge of the faceplate attachment area as a guide. The first faceplate is then attached to the faceplate attachment area of the ear insert.

BRIEF DESCRIPTION OF THE DRAWINGS

Further advantages of the disclosure are apparent by reference to the detailed description when considered in conjunction with the figures, which are not to scale so as to more clearly show the details, wherein the reference numbers indicate like elements throughout the several views, and wherein.

DETAILED DESCRIPTION

Figure 1:
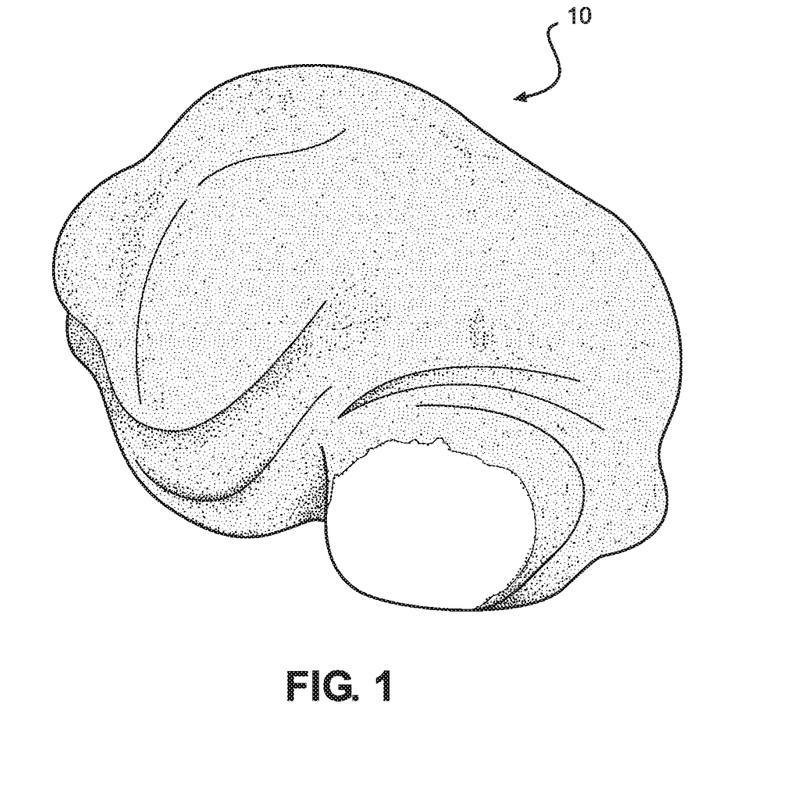
FIG. 1 depicts an impression of a portion of an ear formed in an impression medium.

Referring now to the drawings, in which like reference characters identify like parts or corresponding parts throughout the several views, there is shown in FIG. 1 an impression 10 of at least a portion of an ear canal and concha of an individual. The impression 10 is formed using an impression medium.

Figure 2:
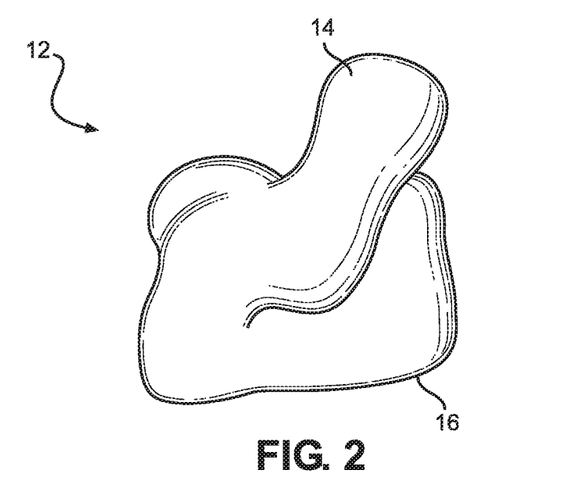
FIG. 2 depicts an inner portion of an initial ear insert formed based on the impression shown in FIG. 1.

Shown in FIG. 2 is an initial ear insert 12 formed based on the impression 10. As a preliminary step in the formation process, the impression 10 may be modified by hand to provide for a more suitable fit. The impression 10 is then scanned using, for example, a 3-D scanner, and may be further modified through the use of software. After a suitable impression 10 and scan of the impression are obtained, the impression is then reproduced through 3-D printing or cast in a medium to form the insert 12. The insert 12 includes an inner portion 14 that is configured for insertion into the ear canal of the individual. The insert 12 also includes an outer portion 16 that is configured to face outwards away from the ear when the inner portion 14 is inserted into the ear canal.

Figure 3:
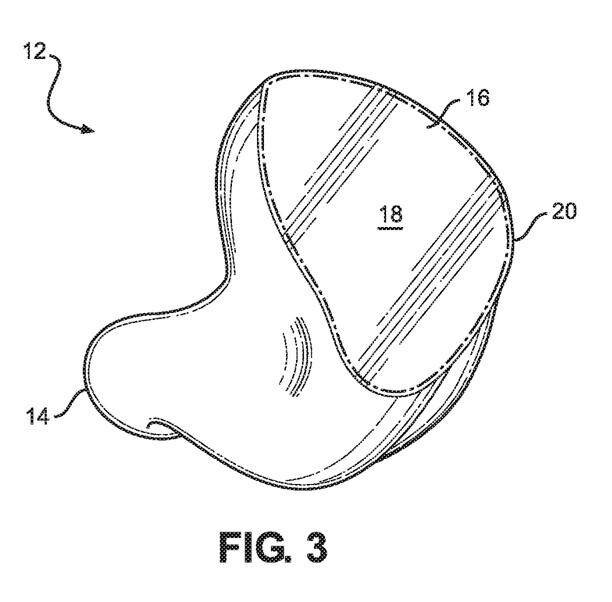
FIG. 3 depicts an outer portion of the initial ear insert of FIG. 2 including a faceplate attachment area and perimeter edge.

With reference to FIG. 3, the outer portion 16 of the insert 12 may be further modified to provide a faceplate attachment area 18 having a perimeter edge 20. The faceplate attachment area 18 is configured to receive a faceplate having an outer edge that corresponds with the perimeter edge 20 of the faceplate attachment area. The faceplate and the method of its attachment are discussed in detail below. To accommodate the faceplate, the faceplate attachment area 18 is preferably a smooth, flat area that allows the faceplate to make full contact with the faceplate attachment area. Machining processes, such grinding or sawing, may be used to remove portions of the outer portion 16 to form the faceplate attachment area 18. The size and shape of the faceplate attachment area 18 may be modified to achieve a desired look and also to achieve an acceptable degree of coverage of the individual's ear concha. In other words, the faceplate attachment area 18 may be modified to provide a better fit with the individual's ear. Additionally, the size of the faceplate attachment area 18 may be selected to cover a greater or lesser amount of the ear concha. A larger faceplate attachment area 18 would result in a larger amount of the ear concha being covered by the resulting faceplate and a smaller faceplate attachment area 18 would result in a lesser amount of the ear concha being covered by the resulting faceplate.

After the size and shape of the insert 12 has been finalized, including the size and shape of the faceplate attachment area 18 and its perimeter edge 20, a model of at least the perimeter edge 20 of the faceplate attachment area is generated. The model may include other portions of the insert 12 instead of or in addition to the perimeter edge 20 of the faceplate attachment area 18. As the term is used herein, a "model" may be any reproduction or re-creation of any portion of the insert 12 formed by any method, including but not limited to tracing, transferring, projecting, copying, photographing, etc. For example, the perimeter edge 20 of the insert 12 may be traced to generate a tracing corresponding to the perimeter edge. Then an image of the tracing may be scanned into a computer and that image may be imported into software that automatically generates the model from the image or enables the tracing to be re-created electronically.

Figure 4:
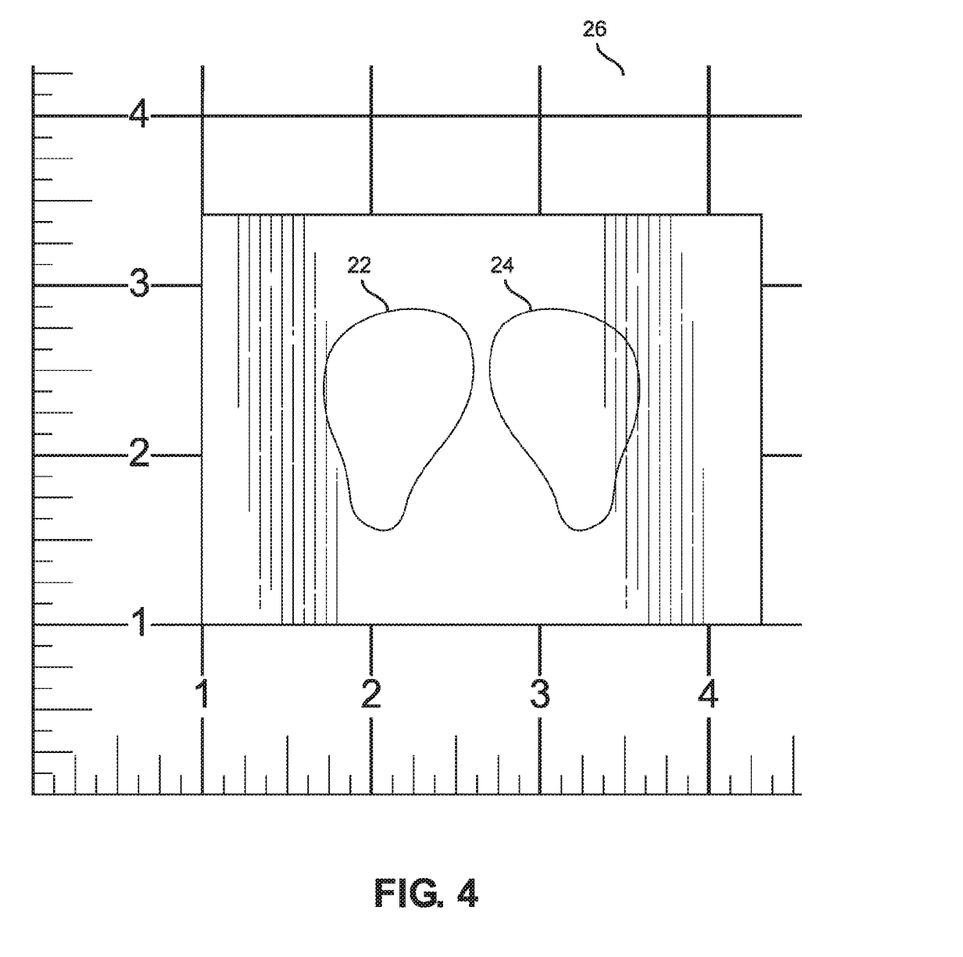
FIG. 4 depicts tracings of perimeter edges of a left and right initial ear insert including a scale to assist in maintaining an equivalent aspect ratio in models based on the tracings.

In generating the model, it is important to maintain the scaling or aspect ratio of the model. In other words, the height and width of the model should correspond very closely to the height and width of the insert so that the resulting faceplate fits accurately. Additionally, when multiple models are made, such as when faceplates for left and right ear inserts are being created, it is important to maintain the scaling or aspect ratio between the models. Preferably, the scale of the model generated and the perimeter edge of the insert have an exact 1:1 ratio. One method for ensuring proper scaling is to utilize a scale or graph in the process of making the model. For example, FIG. 4 illustrates a left tracing 22 and a right tracing 24 that correspond to the perimeter edge 20 of left and right inserts. The tracings 22, 24 are placed on a grid 26 to ensure that the models based on these tracings are properly scaled. Maintaining proper scaling is important because it ensures that sizing of the left and right faceplates, for example, remain consistent. Additionally, maintaining proper scaling allows the models to be scaled up or scaled down as needed while still maintaining a proper fit of the resulting faceplate. This may be useful, for example, if the model is scaled up to allow for additions to be made more easily and then scaled back down to its original size. Accordingly, in certain embodiments, the model produced is a mathematical model, such as a scalable vector model or vector graphic, that may be scaled to any size.

Figure 5:
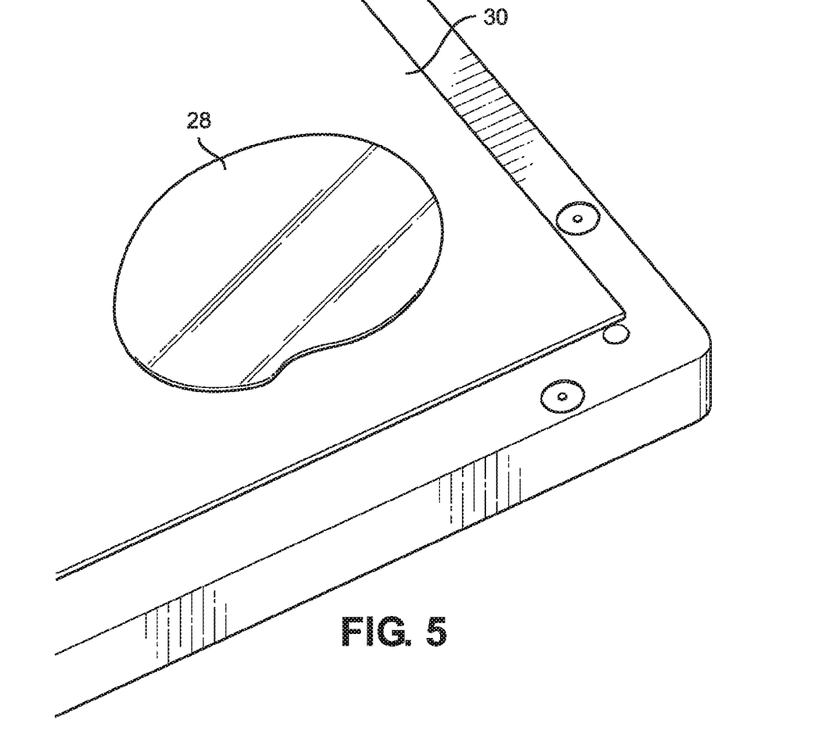
FIG. 5 depicts a faceplate material on a printer table before an ornamental design is placed on the faceplate material.
Figure 6:
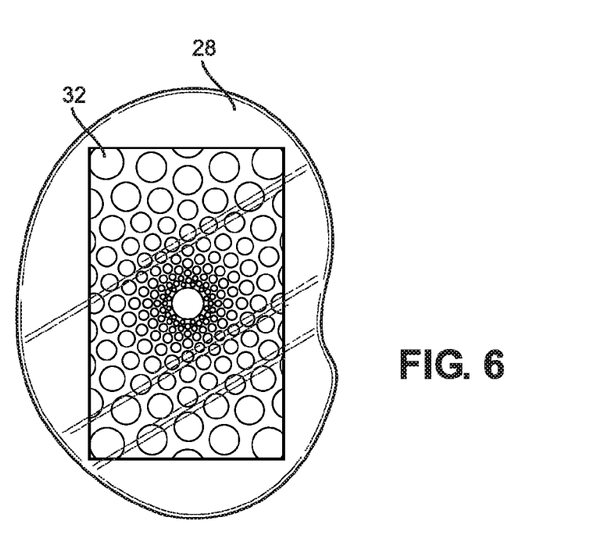
FIG. 6 depicts the faceplate material of FIG. 5 including an ornamental design.

Once the model is finalized, a faceplate may be generated. With reference to FIGS. 5-8, one embodiment of a process for forming a faceplate based on the model according to the present disclosure is illustrated. First, as shown in FIGS. 5 and 6, a faceplate material 28 is provided on a printer bed 30 and then an ornamental design 32 is printed onto the material 28. In this case, the faceplate material 28 is a clear resin material that provides a suitable printing surface and the ornamental design 32 is printed directly onto that printing surface. The faceplate material 28 is not limited to resins. Any safe material that is suited for being formed into a faceplate may be used for the faceplate material 28, including for example, plastic, rubber and the like.

In other embodiments, the faceplate material 28 has an ornamental design already incorporated into the faceplate material itself. In other embodiments, the ornamental design is applied to a surface of the faceplate material using methods other than printing. For example, the ornamental design may be carried on a backing material which is then adhesively applied or otherwise bonded to the faceplate material. In other embodiments, the ornamental design may comprise machining or surface texturing applied to the faceplate material 28. In other embodiments, the ornamental design is drawn or painted onto the faceplate material (i.e., not printed).

Figure 7:
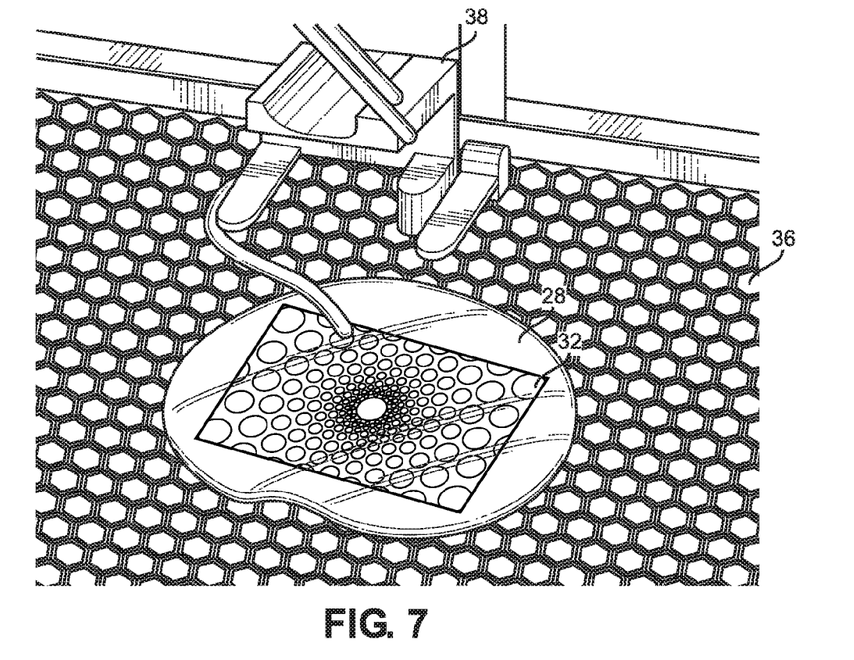
FIG. 7 depicts the faceplate material of FIG. 6 on a laser table.
Figure 8:
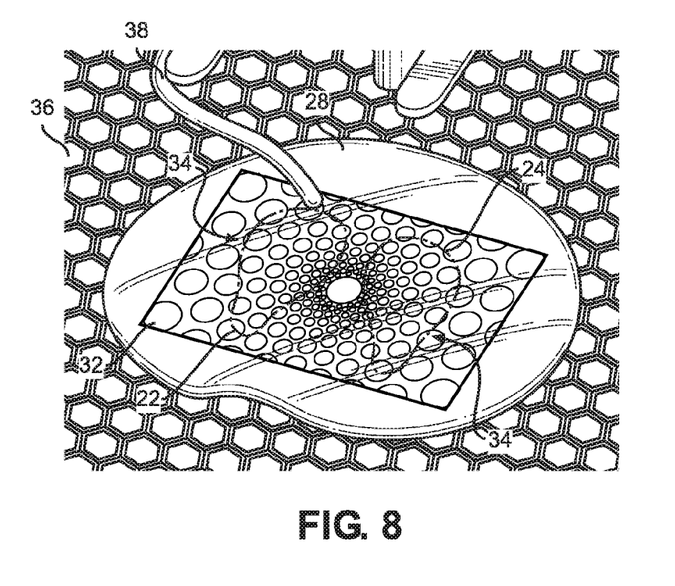
FIG. 8 depicts the faceplate material of FIG. 7 with a laser being guided by a model to form faceplates.

After any ornamental designs 32 are applied to the faceplate material 28 (if any), a faceplate 34 is formed from the faceplate material. In the embodiment of FIGS. 7 and 8, the faceplate material 28 is placed onto a laser bed 36 and a laser 38 is used to cut the faceplate 34 from the faceplate material 28. The relative position of the faceplate material 28 with respect to the laser 38 is guided by the model of the perimeter edge 20 of the faceplate attachment area 18 (FIG. 3). In FIG. 8, the left and right tracings 22, 24 (FIG. 4) have been shown in dashed lines on the faceplate material 28. Using the model formed from the tracings 22, 24 of the perimeter edges 20 as a guide, the laser 38 (or laser bed 36) is guided by a computer (not shown) to form faceplates 34 having that exact dimensions and shape of the perimeter edge of the inserts. Since the perimeter edge 20 has been electronically stored as a model, it may be used to quickly, repeatedly and reliably create numerous easily interchangeable faceplates 34 having different ornamental designs.

Figure 9:
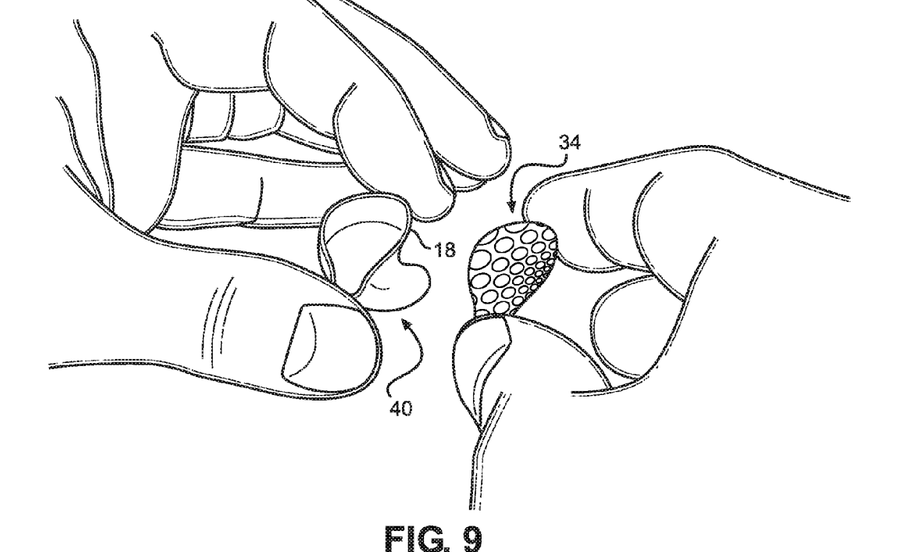
FIG. 9 depicts a faceplate being attached to a faceplate attachment area of a final ear insert.
Figure 10:
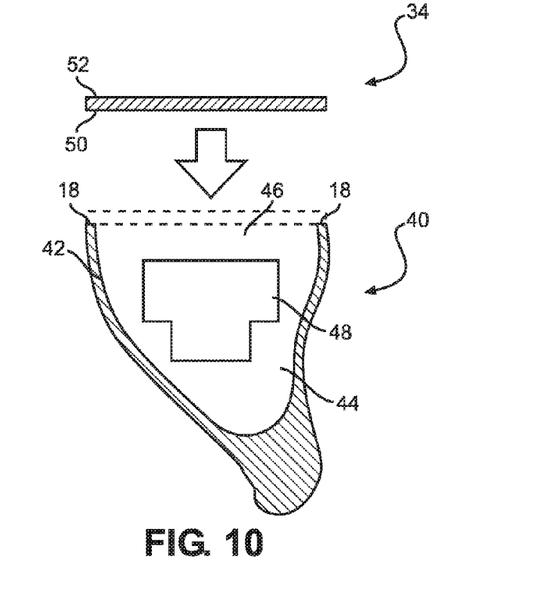
FIG. 10 is a side cross-section view of a faceplate being placed onto a final ear insert having sound reproduction electronics located inside the insert.

As shown in FIGS. 9 and 10, the faceplate 34 may be mounted to the attachment area 18 of a final ear insert 40. The final ear insert and the initial ear insert may be one and the same insert. Alternatively, the initial ear insert may be used initially to produce the tracing or model of the perimeter edge 20 discussed above and shown in FIG. 3, and then a different final insert may be combined with the faceplate 34. One reason that different inserts may be required is that the initial insert may be formed of a material that is easily modified to achieve a perfect fit for the user. Thus, material suitable for being modified (e.g., by grinding or machining) may be used for the initial ear insert. On the other hand, a different, more durable material may be used for the final insert. Also, the structure of the initial and final ear inserts may be different. For example, the initial ear insert may be solid without any internal cavities following its production. On the other hand, the final ear insert may have cavities, spaces, openings, markings or other structural differences that are required for its manufacture or for use by the final user.

In the embodiment shown in FIGS. 9 and 10, the final insert 40 includes an external wall or shell 42 that defines an internal cavity 44. An opening 46 is formed in the outer portion of the insert 40. Sound reproduction electronics 48 may be inserted into the cavity 44 via the opening 46 prior to attaching the faceplate 34. The sound reproduction electronics 48 are for generating sound waves in the ear. The faceplate 34 has an inward-facing surface 50 that is attached to the faceplate attachment area 18 of the final ear insert 40. In this case, the faceplate attachment area 18 is a flat section formed along the perimeter of the opening 46 at the top of the shell wall 42. An outward-facing surface of the faceplate 34 is opposite from the inward-facing surface 50 and is visible when the insert 40 is placed within the user's ear.

An ornamental design 32 may be disposed on the inward-facing surface 50 or the outward-facing surface 52 of the faceplate 34. In either case, the ornamental design and the faceplate 34 are configured so that the ornamental design is visible when looking at the ear of a person wearing the insert. For example, in one embodiment, the ornamental design is disposed on the inward-facing surface of the faceplate 34. In this embodiment, the faceplate material is at least partially transparent so that the ornamental design is at least partially visible when looking at the outward-facing surface 52 of the faceplate 34. In other cases, the ornamental design is disposed on the outward-facing surface 52 of the faceplate 34. Additionally, a protective coating may be applied over the ornamental design 32.

The ornamental design 32 may include any pattern, design, image, photograph, etc. These designs may be selected by the user for placement on the faceplate 34 in order to customize the insert 40. Thus, one advantage of this method is that it permits a user to change the appearance of the insert 40 quickly easily, and at a relatively low cost by simply printing a different faceplate 34 and mounting it to the insert 40.

There are at least two ways that the faceplates 34 may be interchanged. The first method involves forming a second faceplate 34 and then attaching the second faceplate on top of the first faceplate (i.e., without first removing the first faceplate from the insert 40) so that the first ornamental design 32 is at least partially covered and the second ornamental design is visible. The second faceplate 34 is formed out of a faceplate material 28 using the model of the perimeter edge 20 discussed above that was used in forming the first faceplate as a guide, so the shape of each faceplate is identical. This enables faceplates 34 to be easily interchangeable. The same or different ornamental designs 32 may be used on the various faceplates. Finally, the second faceplate 34 is attached to the faceplate attachment area 18 of the final ear insert 40 in the manner discussed above. Alternatively, the first faceplate 34 may be removed from the faceplate attachment area 18. Then, the second faceplate 34 may be attached to the faceplate attachment area 18.

Another embodiment provides a method for creating a pair of ear inserts with decorative left and right faceplates for an individual's left and right ears, where the faceplates may be exchanged for different faceplates. In a first step of the method, an impression medium is inserted into the left and right ears of the individual to form a left ear impression of at least a portion of the left ear in the impression medium and a right ear impression right of at least a portion of the right ear in the impression medium.

Next, a left ear insert configured for insertion into the left ear is formed based on the left ear impression. Similarly, a right ear insert configured for insertion into the right ear is formed based on the right ear impression. Each ear insert includes an inner portion configured for insertion into the respective left or right ear canal. Also, each ear insert includes an outer portion configured to face outward away from the ear when the inner portion is inserted into the ear canal. The outer portion includes a faceplate attachment area having a perimeter edge. The faceplate attachment area is configured to receive a faceplate. As discussed below, each faceplate is made to conform identically to the perimeter edge of the faceplate attachment area.

After the inserts have been formed, a model of the perimeter edge of the faceplate attachment area of both the left and right inserts is created. In this embodiment, the model is created by tracing the perimeter edge of the faceplate attachment area of each insert. However, other methods of creating the model are disclosed above and could be used here. The final step in creating a left model and right model is to digitize the tracings. In digitizing the tracings and creating the models, it is important that the aspect ratio of the left and right models is maintained. In particular, the relative width and height of the left model and the right model should remain the same to prevent one of the models from being larger or smaller than the other. Additionally, the relative size of the model to the original perimeter edge should remain constant. Preferably, there is a perfect size match (1:1 ratio) between the perimeter edge and the model generated using the method above.

Using the models as a guide, left and right faceplates are created in a faceplate material. Various methods for forming the faceplate may be used. For example, they may be formed by machining processes, such as cutting or grinding. However, preferably, the faceplates are formed by a laser cutting device, where the position of the laser relative to the faceplate material is guided by the model. The left and right faceplates are then attached to the faceplate attachment area of the left ear insert and right ear insert, respectively.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated.

What is claimed is:

1. A method for making a custom ear insert having a faceplate, the method comprising the steps of:
   a. inserting an impression medium into an ear having an ear concha and ear canal and forming an impression of at least a portion of the ear concha and ear canal in the impression medium;
   b. forming an initial ear insert based on the impression, the initial ear insert having:
      an inner portion configured for insertion into the ear canal; and
      an outer portion configured to be disposed in the ear concha and to face outward away from the ear, the outer portion including a faceplate attachment area having a perimeter edge and configured to receive a faceplate;
   c. generating a model of the perimeter edge of the faceplate attachment area of the initial ear insert;
   d. forming a first faceplate comprising a faceplate material using the model of the perimeter edge of the faceplate attachment area as a guide, the first faceplate having:
      an inward-facing surface that is configured for attachment to the faceplate attachment area, the inward-facing surface having a first ornamental design disposed thereon that is visible after the first faceplate has been attached to an ear insert; and
      an outward-facing surface disposed opposite the inward-facing surface;
   e. forming a final ear insert having:
      an inner portion configured for insertion into the ear canal; and
      an outer portion configured be disposed in the ear concha and to face outward away from the ear, the outer portion including a faceplate attachment area having a perimeter edge and being configured to receive the first faceplate; and
   f. attaching the first faceplate to the faceplate attachment area of the final ear insert.

2. The method of claim 1 wherein the faceplate material is at least partially transparent such that the first ornamental design is at least partially visible when viewing the outward-facing surface of the first faceplate.

3. The method of claim 1 further comprising the steps of:
   g. forming a second faceplate comprising a faceplate material using the model of the perimeter edge of the faceplate attachment area as a guide;
   h. forming a second ornamental design on a surface of the second faceplate material; and
   i. attaching the second faceplate to the faceplate attachment area of the final ear insert or to the outward-facing surface of the first faceplate such that the second ornamental design is visible.

4. The method of claim 3 wherein the second faceplate covers the first faceplate so that the first ornamental design is at least partially covered by second ornamental design.

5. The method of claim 3 further comprising the step of removing the first faceplate from the faceplate attachment area prior to attaching the second faceplate to the faceplate attachment area.

6. The method of claim 1 wherein the final ear insert comprises a shell having an internal cavity and an opening located in the outer portion, the method further comprising the step of inserting sound reproduction electronics into the internal cavity via the opening prior to step (f), wherein the sound reproduction electronics are for generating sound waves in the ear.

7. The method of claim 1 wherein the model of the perimeter edge of the faceplate attachment area is an electronic model generated by tracing the perimeter edge of the outer portion of the initial ear insert to generate a traced image, digitizing the traced image to generate a digitized image, and generating the electronic model based on the digitized image.

8. The method of claim 7 wherein the step of generating the electronic model based on the digitized image comprises generating a vector model.

9. The method of claim 7 wherein the electronic model is sized on a 1:1 scale with the perimeter edge of the outer portion of the final ear insert.

10. The method of claim 1 wherein the first faceplate is formed by cutting the faceplate material using a laser, wherein a relative position of the faceplate material with respect to the laser is determined based on the model of the perimeter edge of the faceplate attachment area.

11. The method of claim 1 further comprising generating a three-dimensional model of the impression by electronically scanning the impression using a three-dimensional scanner.

12. A method for making a custom ear insert having a faceplate, the method comprising the steps of:
   a. inserting an impression medium into an ear having an ear canal and ear concha and forming an impression of at least a portion of the ear concha and ear canal in the impression medium;
   b. forming an ear insert based on the impression, the ear insert having:
      an inner portion configured for insertion into the ear canal; and
      an outer portion configured to be disposed in the ear concha and to face outward away from the ear, the outer portion including a faceplate attachment area having a perimeter edge and configured to receive a faceplate;
   c. generating a model of the perimeter edge of the faceplate attachment area of the ear insert;
   d. forming a faceplate comprising a faceplate material using the model of the perimeter edge of the faceplate attachment area as a guide, the faceplate having:
      an inward-facing surface that is configured for attachment to the faceplate attachment area, the inward-facing surface having an ornamental design disposed thereon that is visible after the faceplate has been attached to the ear insert; and
      an outward-facing surface disposed opposite the inward-facing surface; and
   e. attaching the faceplate to the faceplate attachment area of the ear insert.

13. The method of claim 12 wherein the faceplate material is at least partially transparent such that the ornamental design is at least partially visible when viewing the outward-facing surface of the faceplate.

* * * * *